United States Patent

Spiller

[15] 3,666,691

[45] May 30, 1972

[54] SOLVENT RECLAIMING OF SYNTHETIC RESINS

[72] Inventor: Lester L. Spiller, 3733 East 55th St., Indianapolis, Ind. 46220

[22] Filed: June 11, 1970

[21] Appl. No.: 45,404

[52] U.S. Cl. .................260/2.3, 260/30.8 DS, 260/33.8 UA
[51] Int. Cl. ..........................................C08f 47/24
[58] Field of Search ...................260/2.3, 30.8 DS

[56] References Cited

UNITED STATES PATENTS 3,203,817 8/1965 Phelisse et al...................260/30.8 DS

FOREIGN PATENTS OR APPLICATIONS 617,788 4/1961 Canada...................260/2.3

*Primary Examiner*—Samuel H. Blech
*Attorney*—Arnold G. Gulko

[57] ABSTRACT

Synthetic resins, and particularly polyvinyl chloride, coated on copper are reclaimed by pouring thereover a mixture of organic solvents containing trichlorethylene and dimethyl sulfoxide as the essential solvents. The solvent mixture is preheated to a temperature in the range of 50°–100° C. and the material being reclaimed is held in an autoclave at a pressure of at least 5 p.s.i. gauge so that the resin being reclaimed is contacted by the solvent mixture in both the liquid and vapor phases.

10 Claims, 1 Drawing Figure

Patented May 30, 1972  3,666,691
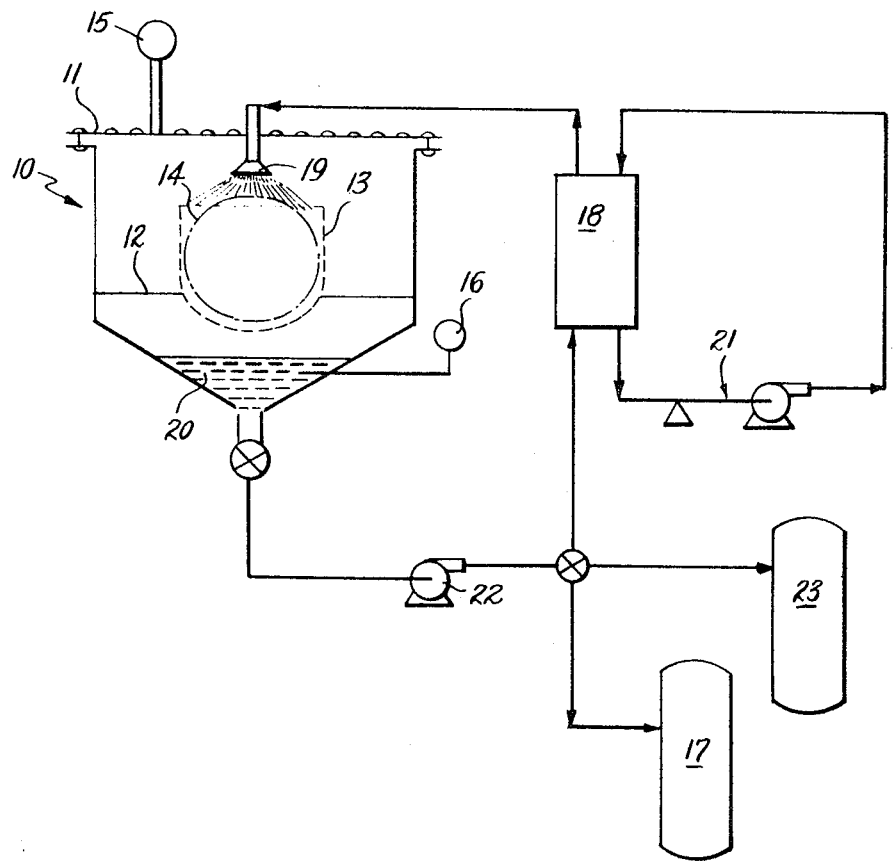
INVENTOR.
LESTER L. SPILLER

SOLVENT RECLAIMING OF SYNTHETIC RESINS

The present invention relates to the reclaiming of synthetic resins, especially polyvinyl chloride resins, which are used for various purposes, frequently as an insulating coating on electrically conductive metals such as copper or aluminum. Accordingly, the invention is of value in the reclaiming of the resin and also in the salvaging of the conductive metal with which they are frequently associated.

The difficulty is that wire coating resins generally and polyvinyl chloride in particular are relatively insoluble in organic solvents and, to the extent that the resin is dissolved, a small proportion of resin in solution produces a high viscosity material which cannot be handled and the economics of such systems are very disadvantageous. When heat is used to increase the dissolving action and lower the viscosity, then the polyvinyl chloride resin tends to decompose, degrading the quality of the resin which is recovered.

In the present invention, a mixture of organic solvents comprising dimethyl sulfoxide and trichlorethylene, preferably in admixture with a ketone such as methyl isobutyl ketone, is preheated to a temperature in the range of 50°–100° C., preferably from 60°–80° C., and poured through the material to be reclaimed which is held in a perforated container, such as a basket, within a closed container, such as an autoclave. As a result, the material being reclaimed is subjected to the solvent mixture in both the liquid phase and the vapor phase. In preferred operation, the liquid accumulates in the bottom of the autoclave for recirculation where it has a temperature just under 80° C. The vapor in the autoclave above the accumulated liquid has a temperature of about 100° C., the vapor pressure varying from 10–30 p.s.i. guage depending on the selected temperature.

Thus, the dissolving action takes place at a relatively low elevated temperature with trichlorethylene under pressure in the vapor phase. Especially in the presence of copper metal, trichlorethylene releases free chlorine within the closed autoclave and this speeds the solubilization of the resin to be reclaimed. It may also contribute to minimizing degradation of the polyvinyl chloride resin, though this seems to be dominated by the unusually effective solubilization which takes place herein at exceptionally low temperature.

In preferred practice, the accumulated solvent is recirculated (with added heat to maintain the desired temperature). After 10–15 minutes, the dissolved resin causes an excessive increase in viscosity at which point, if undissolved resin remains, the viscous solution is removed and fresh preheated solvent mixture is used in its place. Solvent replaced may be carried out incrementally or in one or more stages, as desired.

After the solvent reclamation process has been completed using hot solvent, as described, the hot solvent is removed and cold liquid is pumped through the system to cool the same. This cold liquid may be the same solvent mixture or some other liquid, even water. The purpose is to avoid loss of solvent vapor and minimize the risk of fire when the autoclave is opened to remove the basket containing the treated product from which the resin has been removed (normally copper wire freed from insulating resin coating).

The contents of the basket may be water washed if desired, bulked, or otherwise handled for salvaging. It will be appreciated that the final salvaging of the copper wire, for example, while of importance to the overall salvaging operation, is not a part of this invention except for the fact that this invention removes the resins which normally interfere with the salvaging operation.

On the other hand, this invention results in a solvent solution containing valuable dissolved resin. Recovery of the resin from the solution is itself conventional, e.g., the solvents are evaporated with the aid of vacuum and recovered for reuse by condensation, all as is well known in the art.

The essential solvents in the mixture are trichlorethylene and dimethyl sulfoxide. The ratio of these solvents can vary from about 20/80 to 95/5 (trichlorethylene/dimethyl sulfoxide). The preferred ratios use excess trichlorethylene, e.g., 55/45 to 94/6. When ketone is added, which is particularly preferred, the dimethyl sulfoxide desirably constitutes from 6–25 percent, most preferably from 8–15 percent of the mixture, with the trichlorethylene being present in a volume ratio with respect to the dimethyl sulfoxide of from 2:1 to 10:1, preferably 3:1 to 8:1. The balance of the solvent mixture is desirably constituted by a ketone having the formula:

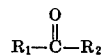

in which $R_1$ is methyl or ethyl and $R_2$ is $C_2 - C_4$ alkyl. Methyl isobutyl ketone is especially preferred in a weight ratio with respect to the trichlorethylene of from 2:1 to 1:2.

The proportion of solvent to resin extracted depends wholly on the desired completeness of the extraction operation which is not a prime aspect of the invention.

The invention is illustrated in the accompanying schematic drawing in which the numeral 10 identifies an autoclave having a removable head 11 and a support mechanism 12 which holds a perforated basket 13 within which is placed the products 14 to be salvaged. Appropriate devices for measuring pressure 15 and temperature 16 are provided.

The solvent mixture to be used is taken from a storage tank 17 and pumped through heat exchanger 18 where it is preheated and then sprayed or otherwise poured onto the product 14 being treated, the solvent trickling through to collect at the bottom of the autoclave. The spray device is identified at 19 and the collected solution is shown at 20.

Heating at 18 is continued using the heating circuit 21 until the desired temperature is reached as shown at 16. In preferred operation, the temperature is less significant than the pressure in the autoclave which should be at least 5 p.s.i. at the gauge 15, and is preferably from 10–30 p.s.i.

The solution 20 is circulated by pump 22 until it is unduely viscous or extraction is complete. In the preferred operation conducted in stages, the viscous solution is drawn off to tank 23 and fresh solution is taken from tank 17 and heated to complete the extraction process.

At the end of the process, it is convenient to replace the solution 20 with unheated solvent mixture from tank 17 to complete the extraction while cooling the autoclave. This final cool solution is used in the initial stage of treatment for the next batch.

To illustrate operation on scrap copper wire coated with polyvinyl chloride insulation, the following solvent mixture is used:

| Parts* | Solvent |
|---|---|
| 100 | methyl isobutyl ketone |
| 100 | trichlorethylene |
| 20 | dimethyl sulfoxide |

*All parts specified herein are by volume.

Using this mixture, the mixture was preheated and circulated to establish a temperature of just under 80° C. in the collected liquid 20 and a temperature of about 100° C. in the gas phase which exhibits a pressure of about 20 p.s.i. at the gauge 15. Under these conditions, the circulating solvent mixture dissolves the polyvinyl chloride quite well and without degrading the resin.

The invention is defined in the claims which follow.

I claim:

1. A process for reclaiming synthetic resins comprising polyvinyl chloride comprising pouring a mixture of organic solvents containing as the essential solvents trichlorethylene and dimethyl sulfoxide preheated to a temperature in the range of 50°–100° C. through the material to be reclaimed in an autoclave maintained at a pressure of at least about 5 p.s.i.

gauge so that the material to be reclaimed is contacted by said solvent mixture in both the liquid and vapor phases, the ration of trichlorethylene to dimethyl sulfoxide being from about 20/80 to 95/5.

2. A process as recited in claim 1 in which said mixture of solvents is collected and recirculated until its viscosity is excessive.

3. A process as recited in claim 2 in which the temperature of the collected liquid is in the range of 60°–80° C.

4. A process as recited in claim 1 in which the pressure in the autoclave is maintained at from 10–30 p.s.i. gauge.

5. A process as recited in claim 1 in which the dimethyl sulfoxide constitutes from 6–25 percent of the solvent mixture.

6. A process as recited in claim 1 in which the solvent mixture further comprises a ketone having the formula:

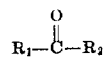

in which $R_1$ is methyl or ethyl and $R_2$ is $C_2 - C_4$ alkyl.

7. A process as recited in claim 6 in which said ketone is methyl isobutyl ketone.

8. A process as recited in claim 6 in which said trichlorethylene is used in excess with respect to the dimethyl sulfoxide in a ratio of from 3:1 to 8:1 and the balance of the solvent mixture is constituted by said ketone.

9. A process as recited in claim 1 in which the material being reclaimed is polyvinyl chloride resin.

10. A process as recited in claim 9 in which said polyvinyl chloride is coated on copper.

* * * * *